T. S. E. DIXON.
Railway-Car Axles.
No. 157,501. Patented Dec. 8, 1874.
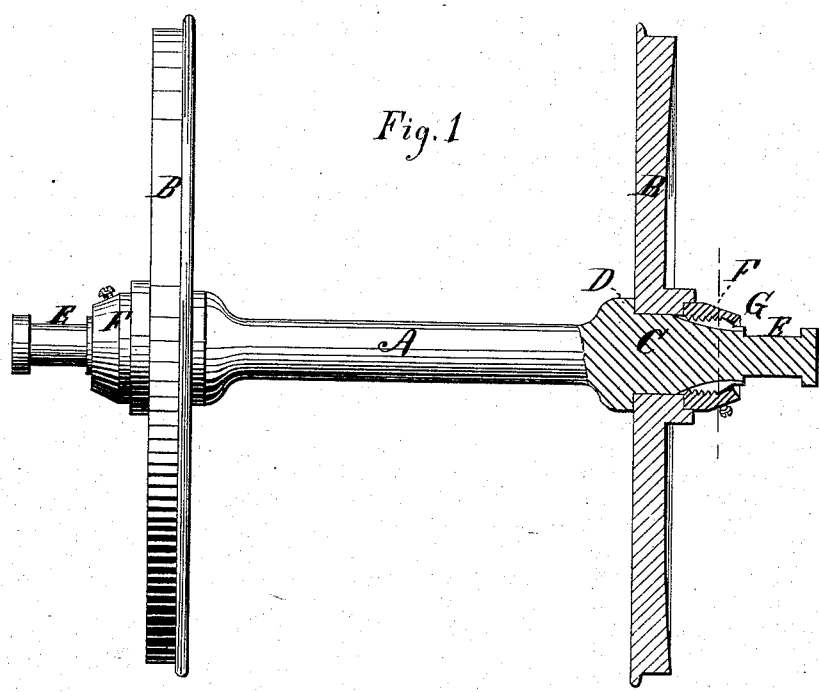
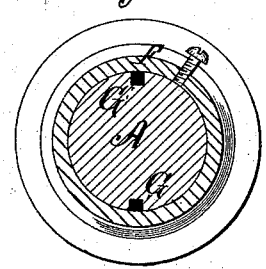
WITNESSES
INVENTOR

UNITED STATES PATENT OFFICE.

THERON S. E. DIXON, OF CHICAGO, ILLINOIS.

IMPROVEMENT IN RAILWAY-CAR AXLES.

Specification forming part of Letters Patent No. 157,501, dated December 8, 1874; application filed November 27, 1874.

*To all whom it may concern:*

Be it known that I, T. S. E. DIXON, of Chicago, county of Cook and State of Illinois, have invented a new and useful Improvement in Railway-Car Axles, of which the following is a specification, reference being had to the accompanying drawing and the letters of reference thereon.

The object of my invention is to furnish a railway-car axle, simply and cheaply constructed, which shall revolve as in the present system, but upon which the wheels are loosely mounted, so as to avoid the torsion or twisting and slipping occasioned by running on a curve or inequality in the track, or with wheels of unequal size, but so adjusted that the wheels shall turn on the axle only sufficiently to accomplish this purpose, thus avoiding the great friction and wear upon the shoulder otherwise incident to a loose wheel—that is, an axle so constructed as to combine the advantages of the loose wheel and of the present revolving axle, with none of the peculiar disadvantages of either; and also so constructed that, in case of the breakage of the wheel, another may be readily substituted away from the shop, and without the use of the hydraulic press.

With this object in view, my invention consists in forming near each end of the axle, by forging or otherwise, in the simplest possible manner, a bearing larger than those at the ends, upon which the wheel is slipped till it strikes a shoulder raised around the inner end of the bearing, and is retained in place by a nut or cap screwed upon the axle till it strikes against the wheel.

Thus constructed, when there is no inequality in either the wheels or the track, the wheels—in obedience to the mechanical law that a wheel free to move on either of two bearings, one larger than the other, will always turn upon the smaller bearing—will not turn on the axle, but wheels and axle will together turn on the smaller bearings at the ends in the oil-boxes; but when a curve or other inequality is encountered, while the same motion of the axle is maintained, one or both of the wheels will turn on the axle just sufficiently to overcome the inequality, instead of slipping on the track, as when fastened rigidly to the axle, and obviously with a great saving of draft and wear upon the wheels and track, and without crystallization of the axle.

The advantage of having both wheels loose is, that in turning a curve, while one of the wheels is pressed by the track so as to hug the axle tightly at the bearing, the other is left free to turn easily, and, in case of accident, with my simple mode of attachment either wheel may be readily replaced.

The wheel is constructed with a hub projecting upon either or both sides, so as to give a larger bearing-surface, and the better to resist the effect of blows and concussions. If preferred, a box of suitable metal may be inserted between the wheel and axle, and fastened to either; and washers may also be used, but the motion on the bearing is so slight that I deem them unnecessary.

The nut or cap extends from the wheel down, if preferred, near to the inner end of the outer bearing of the axle, and one or more holes or grooves run diagonally through it or the axle, as preferred, from the oil-box to the wheel. The oil escaping along the axle from the oil-box is carried through these passages to the wheel by the revolution of the axle, in obedience to the law of centrifugal motion.

The nut is prevented from unscrewing by attaching it firmly to the axle by a screw, bolt, or other suitable means. In the figures, which are sectional views showing the construction of the parts and their combination, A is the axle, having the usual outer bearing E, and an enlarged inner bearing, C, if preferred, of double the diameter of the outer bearing, and of suitable length to fit the hub of the wheel. D is the rim or shoulder at the inner end of the inner bearing, with an elevation, if preferred, of half or three-quarters of an inch. B is the wheel, turning freely upon the bearing C, and held in place by the nut or cap F, which is screwed upon the axle, and prevented from turning by a screw or bolt passing through its side into the axle A. If preferred, the ends of the hub of the wheel may be grooved out, so as to fit over either or both the shoulder D and the nut or cap F. G is an oil-passage, running diagonally through the nut or axle, or both, from a point on the axle near the inner end of the outer bearing E to the bearing C. The elevated shoulder D, and also the bearing C, are of greater diameters than the body of the axle—thus, with the least weight of iron, giving the greatest strength to the axle at the point where fracture usually takes place, and the better enabling it to resist the effect of blows and concussions coming through the wheel.

I am aware that axles with loose wheels, and with double bearings of different sizes, have long been known for various purposes, but for want of proper adaptation they have never come into successful use in railway service.

Having thus described my invention, what I claim, and desire to secure by Letters Patent, is—

1. The railway-car axle A, having an elevated rim or shoulder, D, an inner bearing, C, of greater diameter than the body of the axle, and a smaller outer bearing, E, as set forth.

2. The railway-car axle A, having an elevated rim or shoulder, D, larger bearing C, and smaller bearing E, and provided with the oil-passages G, as set forth.

3. The combination of the loose wheel B, revolving axle A, and nut or cap F, having in connection therewith the oil-passages G, all substantially as and for the purpose set forth.

THERON S. E. DIXON.

Witnesses:
  A. J. REYNOLDS,
  J. M. CUTLER.